(12) United States Patent
Horikawa

(10) Patent No.: US 6,657,541 B2
(45) Date of Patent: Dec. 2, 2003

(54) REVERSING ALARM APPARATUS FOR A WORK VEHICLE

(75) Inventor: Kazuo Horikawa, Ohki (JP)

(73) Assignee: Komatsu Ltd. (JP)

( * ) Notice: Subject to any disclaimer, the term of this patent is extended or adjusted under 35 U.S.C. 154(b) by 0 days.

(21) Appl. No.: 10/078,508

(22) Filed: Feb. 21, 2002

(65) Prior Publication Data

US 2002/0126003 A1 Sep. 12, 2002

(30) Foreign Application Priority Data

Feb. 22, 2001 (JP) ........................ 2001-047140

(51) Int. Cl.[7] .................................. P60Q 1/22
(52) U.S. Cl. ................... 340/463; 340/469; 340/472; 340/431; 340/435; 340/384.1
(58) Field of Search .................... 340/463, 469, 340/472, 431, 435, 384.1

(56) References Cited

U.S. PATENT DOCUMENTS

| | | | | |
|---|---|---|---|---|
| 3,569,927 A | * | 3/1971 | Guyton et al. | 340/463 |
| 6,025,778 A | * | 2/2000 | Dietz et al. | 340/463 |
| 6,281,786 B1 | * | 8/2001 | Adachi et al. | 340/435 |
| 6,471,619 B2 | * | 10/2002 | Nanri et al. | 477/52 |

FOREIGN PATENT DOCUMENTS

JP  98-80449  3/1996

* cited by examiner

Primary Examiner—Daniel J. Wu
Assistant Examiner—Tai T. Nguyen
(74) Attorney, Agent, or Firm—Rader, Fishman & Grauer PLLC

(57) ABSTRACT

A reversing operation detecting device for a work vehicle, in which a forward and reverse travel operating lever is favorable in operability and which stably detects the reversing operation of the operating lever to be capable of issuing a vehicle reversing alarm. A non-contact type sensor detects the reversing operation of the forward and reverse travel-operating lever. A detected link is provided to perform opposite swinging motions in forward and reverse directions, respectively, following the swinging of the operating lever in forward and reverse directions, and the reverse swinging motion of the detected link intersects the non-contact type sensor for detection of reverse operation. The detected link is composed of an interlocking lever interlocking with a forward and reverse swinging shaft of the operating lever to swing, and a seesaw movement lever performing a motion to follow swinging of the interlocking lever in a reverse direction to approach a detecting surface of the non-contact type sensor to actuate the non-contact type sensor and a motion to follow swinging of the interlocking lever in a forward direction to separate from the detecting surface of the sensor to make the sensor inactive.

4 Claims, 5 Drawing Sheets

TO AN ALARM CIRCUIT

TO AN ALARM CIRCUIT

REVERSING ALARM APPARATUS FOR A WORK VEHICLE

BACKGROUND OF THE INVENTION

The invention relates to a reversing alarm apparatus for a work vehicle, and more particularly, to a reversing alarm apparatus for a work vehicle, which detects reversing operation of a vehicle forward and reverse travel operating lever to transmit a vehicle reversing alarm in a vehicle forward and reverse travel operating lever device for performing speed control proportional to a magnitude of an operating stroke of the forward and reverse travel operating lever.

Conventionally, many work vehicles mount thereon a reversing alarm device for a work vehicle. Therefore, in a work vehicle, in which a traveling speed is controlled in proportion to a magnitude of an operating stroke of a forward and reverse travel operating lever, a vehicle reversing alarm is issued upon detection of reversing operation of the forward and reverse travel operating lever.

The prior art disclosed in, for example, Japanese Patent Laid-Open No. 80449/1996, s well known and a circuit diagram described in the publication is shown in FIGS. 5 to 7. With a first prior art of the publication, provided near a forward and reverse travel operating lever 32 for operating a direction switching valve 31, which controls a traveling motor 30, as shown in FIG. 5 is a limit switch 33 for detecting the reversing operation of the forward and reverse travel operating lever 32, so that a signal from the limit switch 33 is used to detect the reversing operation of a vehicle to issue a reversing alarm. Also, with a second prior art of the publication, a pressure switch 35 is provided in an operating pressure circuit 34 at the time of reverse traveling rotation of the traveling motor 30 as shown in FIG. 6, so that a signal from the pressure switch 35 is used to detect the reversing operation of a vehicle to issue a reversing alarm. Further, with a third prior art of the publication, a pressure switch 39 is provided in a reverse travel operating pilot pressure circuit 38 of a pilot valve 37 for operating a pilot direction switching valve 36, which serves for the forward and reverse travel operation and controls the traveling motor 30, as shown in FIG. 7, so that a signal from the pressure switch 39 is used to detect the reversing operation of a vehicle to issue a reversing alarm.

However, the prior art disclosed in the above-mentioned Japanese Patent Laid-Open No. 80449/1996 involves the following problems.

In the first prior art, in which the limit switch 33 detects the reversing operation of the forward and reverse travel operating lever 32, there is a need of applying an operating force required for pushing a detection rod (a roller adapted to be pushed when contacted by a cam or the like) of the limit switch 33 at the time of reversing operation of the forward and reverse travel operating lever 32. However, the limit switch 33 used in construction machines or the like is ordinarily strongly-built to have durability according to severe circumstances and use in work site, so that a large operating force must be applied to push the detecting rod of the limit switch 33 at the start of reversing operation, which would cause the possibility that after such pushing the detecting rod makes a stroke beyond a desired stroke position to attain an unexpected reversing speed. Also, since the limit switch 33 is not contacted in forward travel operation but rather contacted in reverse travel operation, there is caused a problem that the forward and reverse operating forces become uneven to make an operating feeling of the forward and reverse travel operating lever 32 unfavorable and, in particular, to make a minute reversing operation difficult.

In the second and third prior arts, in which the pressure switch detects the reverse travel acting pressure and the reverse travel operating pilot pressure of the traveling motor 30, there are caused problems that a stable detecting action cannot be obtained under the influence of oil temperature and pulsation of a pressure fluid and that even after the reversing operation of the travel operating lever is stopped, a residual pressure of the pressure fluid maintains a state of detecting operation by the pressure switch to cause sounding of a reverse alarm.

BRIEF SUMMARY OF THE INVENTION

In order to improve the above-mentioned problems involved in the prior technical means, in which the reversing operation of the forward and reverse travel operating lever is indirectly grasped by a limit switch or detection of the reversing operating pilot pressure or the reversing drive pressure of a traveling drive system to sound a reversing alarm, the invention has its object to provide a reversing alarm apparatus of a work vehicle, in which reversing can be operated without application of a surplus reversing operating force at the time of reversing operation of a forward and reverse travel operating lever, and movements of the forward and reverse travel operating lever are directly detected to sound a reversing alarm.

In order to attain the above-mentioned object, the first invention provides a reversing alarm apparatus for a work vehicle provided with a forward and reverse travel operating lever device to output a forward and reverse speed command signal in accordance with an amount of an operating stroke, wherein a reversing alarm of the work vehicle is issued by a reversing operation detecting device composed of a non-contact type sensor and provided on the forward and reverse travel operating lever device.

According to the first feature of the invention, since the non-contact type sensor detects movements in the reversing operation of the forward and reverse travel operating lever and there is caused no contact between the forward and reverse travel operating lever and the sensor, no change in lever operating forces is caused at the time of reversing operation and operating forces in forward and reverse travel can be made substantially uniform not to injure the operating feeling. Also, the reversing operation is possible with small operating forces to enable improving a minute operability.

Further, since the non-contact type sensor directly detects movements in reversing operation of the forward and reverse travel-operating lever, it is possible to make sure that a reversing alarm is issued and stopped in cooperation with a lever operating action.

The second feature of the invention provides a reversing alarm apparatus for a works vehicle, in which the reversing operation detecting device of the first invention is constructed such that the non-contact type sensor is installed with a sensor detecting surface facing in a direction parallel to a forward and reverse rotation shaft of a forward and reverse travel operating lever, and the reversing operation detecting device is composed of a detected lever linkage mechanism which swings vertically in a plane perpendicular to the forward and reverse rotation shaft following rotation of the forward and reverse rotation shaft of the forward and reverse travel operating lever to intersect a sensor signal of the non-contact type sensor.

According to the second invention, since the detected lever linkage mechanism is designed to follow the reverse travel operation of the forward and reverse travel operating lever to intersect the non-contact type sensor and to follow the forward travel operation not to intersect the non-contact type sensor, the forward travel operation is not detected.

The third aspect of the invention provides a reversing alarm apparatus for a work vehicle, in which the detected lever linkage mechanism of the reversing operation detecting device of the second invention is constructed such that the detected lever linkage mechanism of the reversing operation detecting device comprises a rotation interlocking lever mounted on the forward and reverse rotation shaft of the forward and reverse travel operating lever, and a seesaw movement lever, which includes on one side thereof a lever portion having an elongated hole and on the other side thereof a detected lever portion intersecting the non-contact type sensor, and the rotation interlocking lever serves as a linkage mechanism for connection of the rotation interlocking lever such that a point of engaging cooperation slides in the elongated hole of the seesaw movement lever.

According to the third invention, since the forward and reverse operating rotation interlocking lever mounted on the forward and reverse rotation shaft of the forward and reverse travel operating lever, and the seesaw movement lever are connected to and combined with the non-contact type sensor and the point of engaging cooperation is slidingly moved, there is an advantage that the lever swinging ratio of the seesaw movement lever can be made small as compared with a swinging stroke of the forward and reverse operating rotation interlocking lever and the reversing operation detecting device can be installed in a compact space near the forward and reverse travel operating lever.

The fourth feature of the invention provides a reversing alarm apparatus for a work vehicle, in which the point of engaging cooperation between the seesaw movement lever and the forward and reverse operating rotation interlocking lever in the third invention cooperates in a position close to a seesaw fulcrum when the forward and reverse operating rotation interlocking lever is located in a forward and reverse travel operating neutral turning position, and slides in a direction away from the seesaw fulcrum when the forward and reverse operating rotation interlocking lever turns in a direction of forward and reverse travel operation from the forward and reverse travel operating neutral turning position.

According to the fourth feature of the invention, when the forward and reverse travel-operating lever is operated reversely, the seesaw movement lever is swung from a position where the point of engaging cooperation between the seesaw movement lever and the forward and reverse operating rotation interlocking lever is near the seesaw movement lever fulcrum, a location where the seesaw movement lever is not detected is rapidly entered in the detection range of the non-contact type sensor to enable issuing a reversing alarm without being late for the reversing operation of the forward and reverse travel-operating lever.

DETAILED DESCRIPTION OF THE INVENTION

[Embodiment]

An embodiment of a reversing alarm apparatus of a work vehicle according to the invention will be described below with reference to FIGS. 1 to 4.

Figure 1:
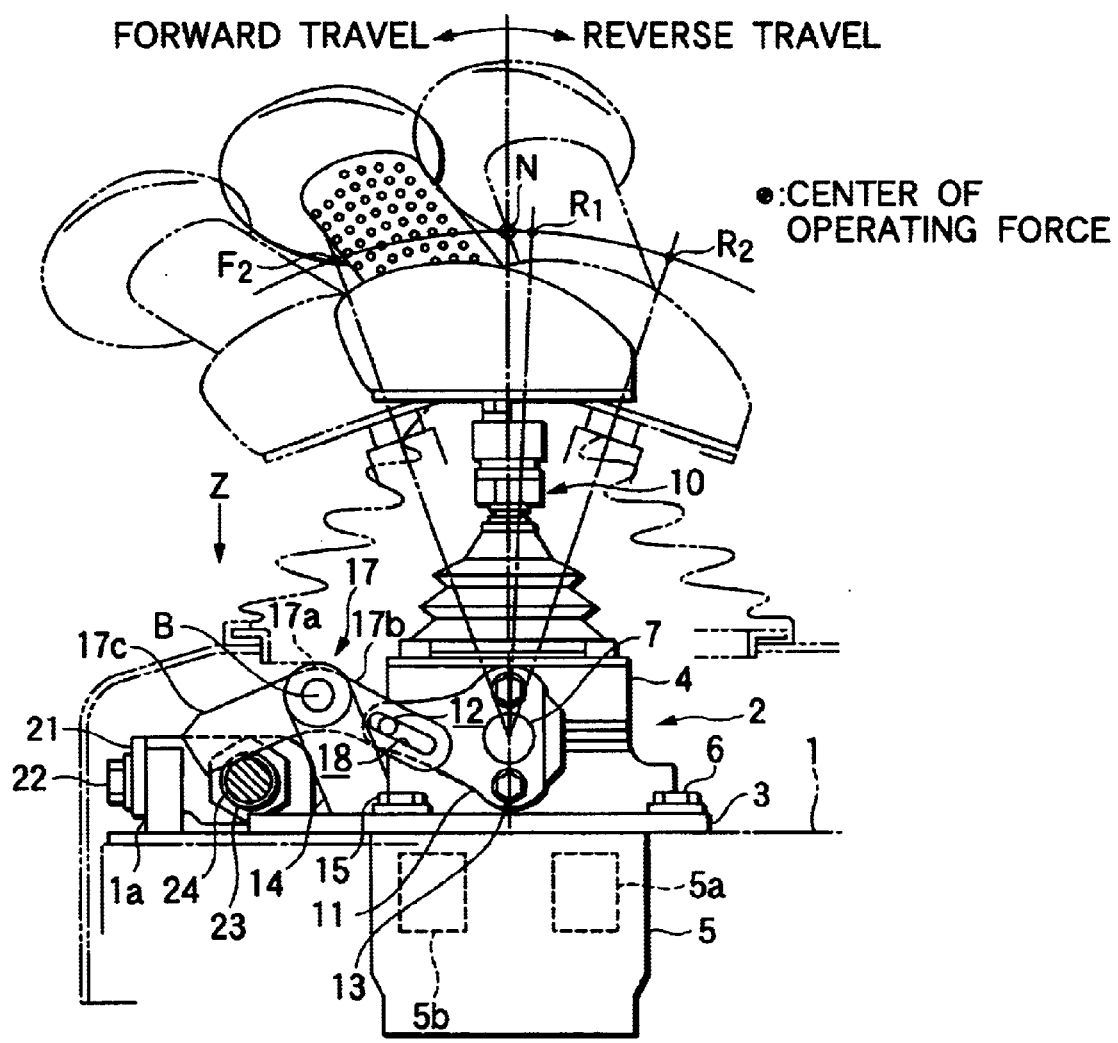
FIG. 1 is a front view showing a reversing operation detecting device according to the invention.

First, the reversing alarm apparatus of a work vehicle according to the embodiment will be generally explained with reference to FIG. 1. FIG. 1 is a front view showing the reversing alarm apparatus of a work vehicle.

As shown in FIG. 1, with the embodiment, the reversing operation of a forward and reverse travel operating lever (referred below as "operating lever") of pilot pressure type 10 is converted into vertical movements of a seesaw movement lever 17 via a rotation interlocking lever 11 mounted to a front and rear rotating shaft of the operating lever, and a detected lever portion 17c provided on the seesaw movement lever 17 is made to intersect a detection surface of a proximity switch 23 to actuate the proximity switch 23, thereby detecting the reversing operation of a vehicle.

Figure 2:
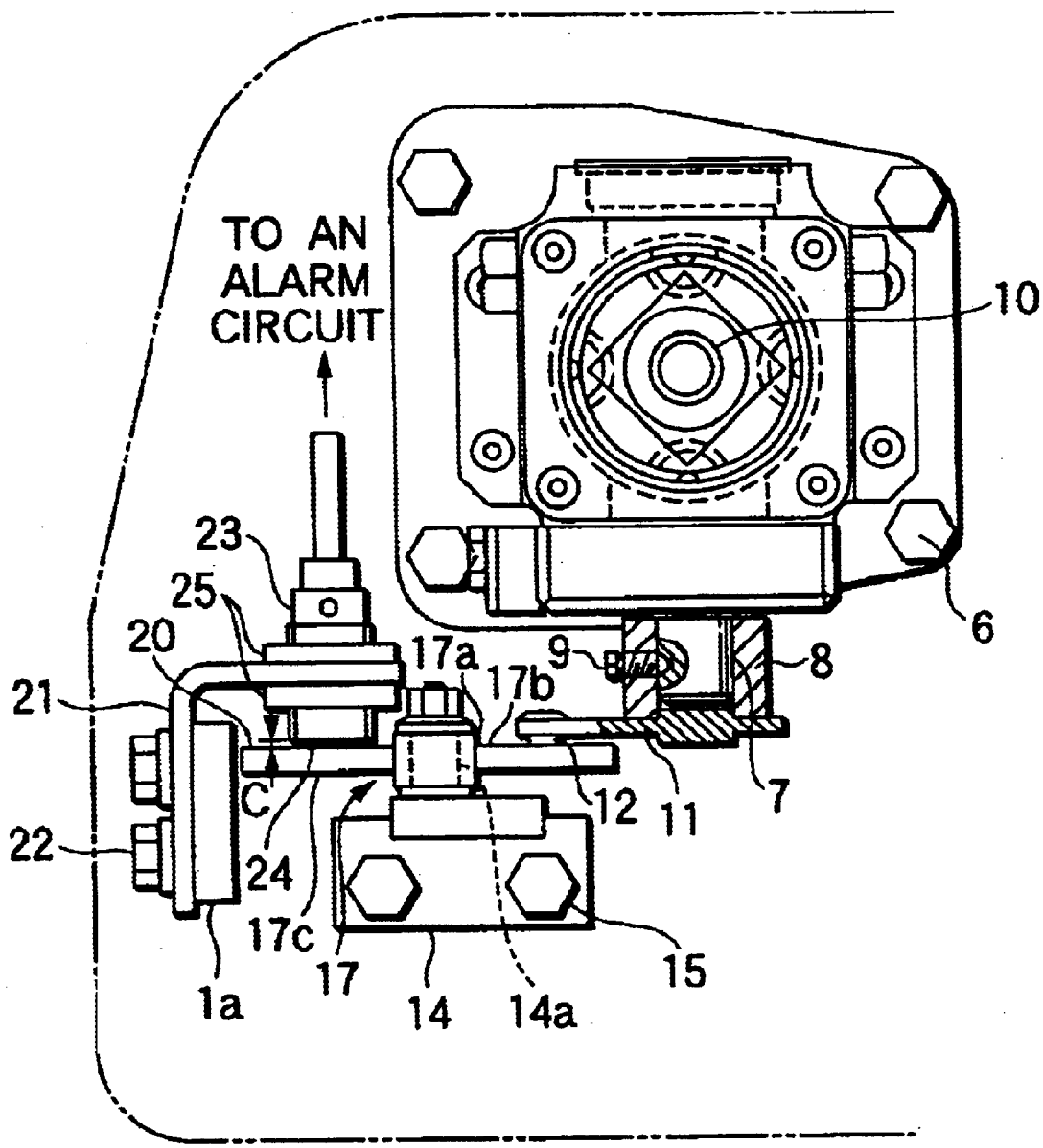
FIG. 2 is a view as viewed along a Z direction of FIG. 1.
Figure 3:
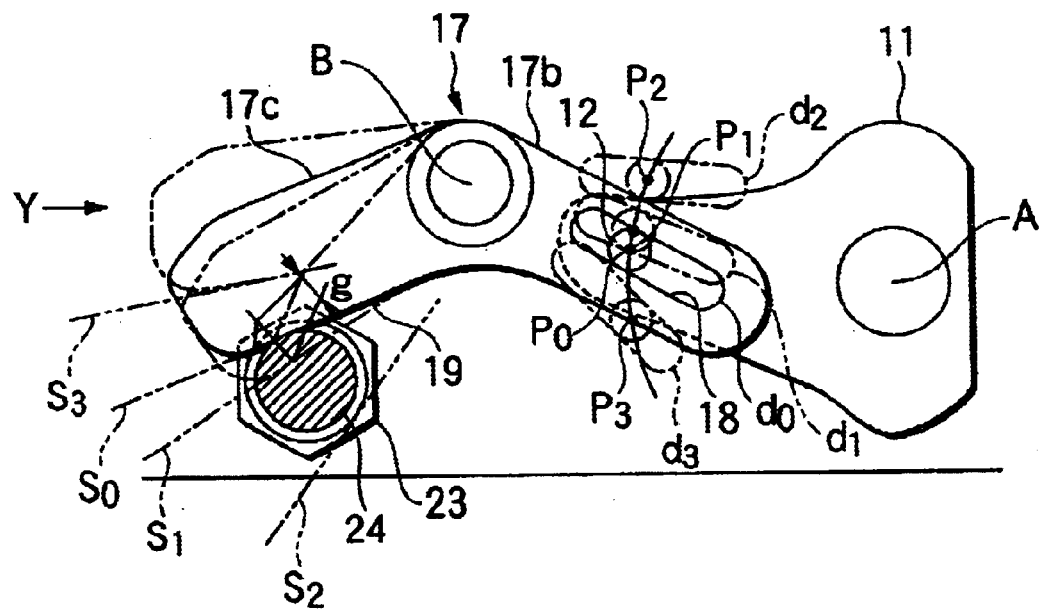
FIG. 3 is a view illustrating the operation of an interlocking lever.
Figure 4:
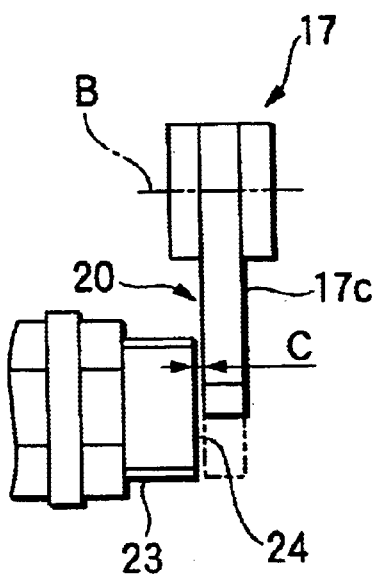
FIG. 4 is a view as viewed along a Y direction in FIG. 3.
Figure 5:
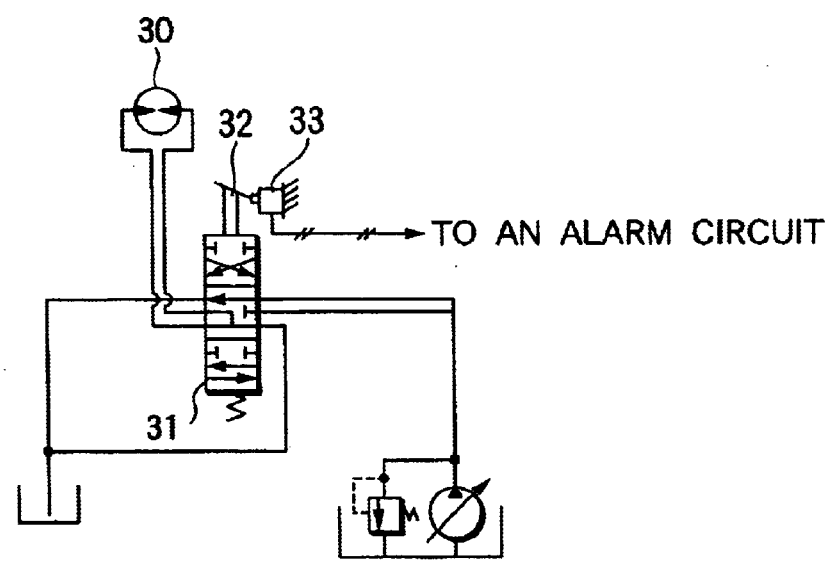
FIG. 5 is a view showing a first example of conventional, reversing operation detecting devices.
Figure 6:
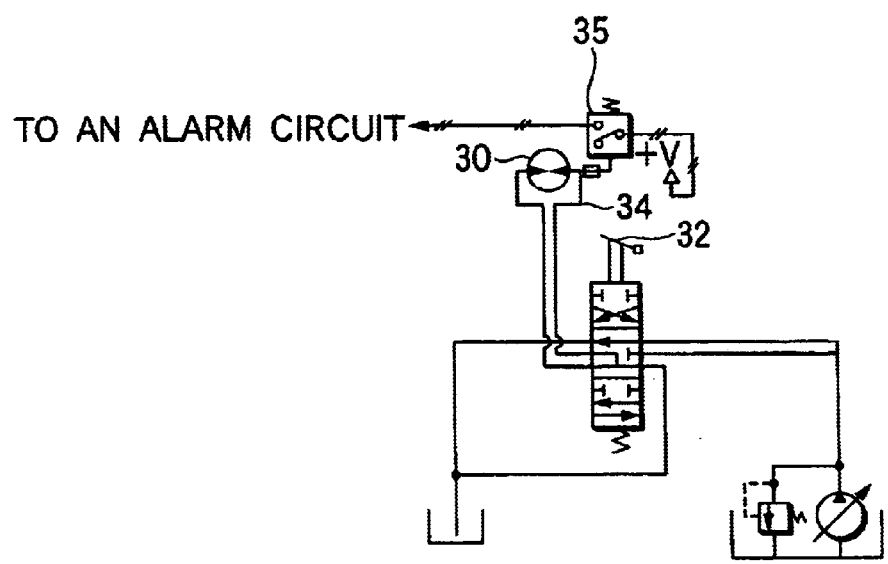
FIG. 6 is a view showing a second example of conventional, reversing operation detecting devices.
Figure 7:
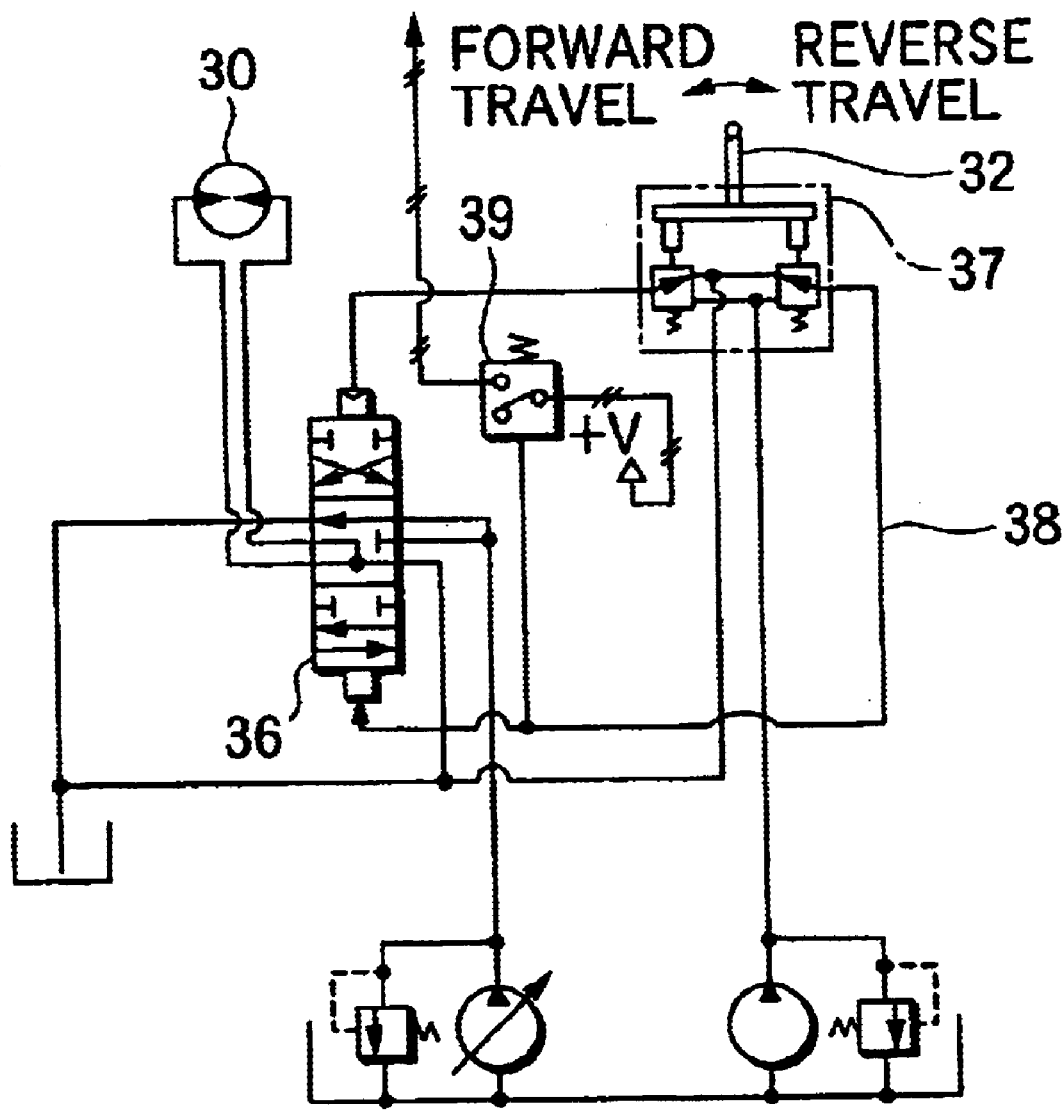
FIG. 7 is a view showing a third example of conventional, reversing operation detecting devices.

An explanation will be given below to a detailed construction of a reversing operation detecting device of a work vehicle in the embodiment with reference to FIGS. 1 to 4. FIG. 2 is a view as viewed along a Z direction of FIG. 1, FIG. 3 is a view illustrating the operation of the rotation interlocking lever, and FIG. 4 is a view as viewed along a Y direction of FIG. 3.

As shown in FIG. 1, a forward and reverse travel operating lever device 2 is one of a pilot pressure operated type that outputs a forward and reverse speed command signal corresponding to an amount of operating stroke by the pilot fluid pressure.

The forward and reverse travel operating lever device 2 includes a PPC valve device 2, in which a body casing 5 receiving therein a pilot operated valve and a lever casing 4 for the forward and reverse travel operating lever are made integral, the lever device 2 being mounted on a top plate 1 of a console provided laterally of an operator seat (not shown) by means of bolts 6.

The forward and reverse travel operating lever 10 is mounted to a forward and reverse travel operating lever rotating shaft 7, which is housed and mounted to the lever casing 4, to swing about an axis A in a front and back direction. When the forward and reverse travel operating lever 10 is operated front and back in a swinging manner, pilot operated valves 5a, 5b housed in the body casing 5 for forward and reverse travel are actuated to direct a pilot fluid to a forward and reverse travel switching valve (not shown) to effect switching of forward and reverse travel directions of a vehicle.

As shown in FIGS. 1 and 2, mounted to the forward and reverse travel operating lever rotating shaft 7 by means of bolts 13 is a rotation interlocking lever 11 that follows rotation of the rotating shaft 7 to swing vertically in a plane perpendicular to the rotating shaft 7. Provided on a tip end of the rotation interlocking lever 11 is a cooperating link pin 12 projecting in parallel to the forward and reverse travel operating lever rotating shaft 7.

Mounted on the top plate 1 of the console by means of bolts 15 is a bracket 14 provided with a bearing portion for a shaft 14a that extends in parallel to the forward and reverse travel operating lever rotating shaft 7. Both lever portions of the seesaw movement lever 17 are mounted on the bearing portion provided on the bracket 14 through the shaft 14a so as to move about the shaft 14a vertically in opposite directions in a plane perpendicular to the forward and reverse travel operating lever rotating shaft 7.

With the seesaw movement lever 17, one of the lever portions 17b has an elongated hole 18, in which the cooperating link pin 12 provided on the rotation interlocking lever 11 is connected for sliding cooperation so that seesaw movements are transmitted from the rotation interlocking lever 11, and the other of the lever portions 17c is provided with a surface 20 adapted to be detected by the proximity switch 23 and intersects a sensing surface of the proximity switch 23 by the seesaw movement.

Also, an L-shaped bracket 21 is mounted by means of bolts 22 to a plate 1a provided upright on the top plate 1 of the console, and the proximity switch 23 being a contact type sensor is mounted to the bracket 21 with a sensor detecting surface 24 directed in parallel to the forward and reverse travel operating lever rotating shaft 7.

In addition, as shown in FIGS. 3 and 4, a predetermined gap C for allowing actuation of the proximity switch 23 is provided between the sensor detecting surface 24 of the proximity switch 23 and the detected surface 20 provided on the lever portion 17c of the seesaw movement lever 17, and set so that the proximity switch 23 is actuated when the detected surface 20 of the lever portion 17c shades the sensor detecting surface 24 of the proximity switch 23 in the range of g or more.

An explanation will be given below to the operation of the above-mentioned construction with reference to FIGS. 1, 2 and 3.

When the forward and reverse travel operating lever 10 in FIG. 1 is put in a neutral position N, a point of engaging cooperation between the cooperating link pin 12 of the rotation interlocking lever 11 that interlocks with the front and back swinging operation of the forward and reverse travel operating lever 10, and the elongated hole 18 of the seesaw movement lever portion 17b remains in a position P0 shown in FIG. 3 to hold the detected surface 20 of the seesaw movement lever portion 17c in a position S0.

Therefore, since the detected surface 20 of the seesaw movement lever portion 17c does not overlap the sensor detecting surface 24 of the proximity switch 23, the proximity switch 23 will not act, so that a reversing operation signal is not issued.

Subsequently, when the forward and reverse travel operating lever 10 is operated to be moved to a reversing starting position R1 from the neutral position N in FIG. 1, a pilot pressure fluid of low pressure is outputted from the pilot operated valve 5a to partly switch the forward and reverse travel switching valve of the vehicle to a reversing position from a neutral position, thus putting the vehicle in a low-speed traveling state. In this state, the point of engaging cooperation between the cooperating link pin 12 of the rotation interlocking lever 11 that interlocks with the front and back swinging operation of the forward and reverse travel operating lever 10, and the elongated hole 18 of the seesaw movement lever portion 17b is displaced to a P1 position to swing the seesaw movement lever 17 to a d1 position, so that the detected surface 20 of the seesaw movement lever portion 17c is swung to a S1 position to overlap the sensor detecting surface 24 of the proximity switch 23 over a range g to act the proximity switch 23 to output a reversing signal, as shown in FIG. 3.

When the forward and reverse travel operating lever 10 is further operated to be moved to a R2 position from a R1 position in FIG. 1, a gradually increasing pilot pressure fluid is outputted from the pilot operated valve 5a to reach a set pressure of high level to change the partial switching of the forward and reverse travel switching valve of the vehicle to the reversing position into a full switching, thus putting the vehicle in a maximum reversing-speed traveling state.

In this state, the point of engaging cooperation between the cooperating link pin 12 of the rotation interlocking lever 11 that interlocks with the front and back swinging operation of the forward and reverse travel operating lever 10, and the elongated hole 18 of the seesaw movement lever portion 17b is displaced to a P2 position to swing the seesaw movement lever 17 to a d2 position, so that the detected surface 20 of the seesaw movement lever portion 17c is swung to a S2 position to overlap the entire sensor detecting surface 24 of the proximity switch 23 to continue the proximity switch 23 to keep a state of outputting a reversing signal, as shown in FIG. 3.

In the above-mentioned reversing operation, the swinging locus P0–P1 of the cooperating link pin 12 slides in the elongated hole 18 of the seesaw movement lever portion 17b to swing approaching a seesaw axis B of the seesaw movement lever 17, whereby an angular change to the swinging locus P0–P1 on the seesaw movement lever portion 17b side is small to enable shortening a time period of displacement. Therefore, an action, in which the detected surface 20 on the seesaw movement lever portion 17c side overlaps the entire sensor detecting surface 24 of the proximity switch 23, can be speeded up to issue a reversing alarm without being late for the reversing operation.

Also, when the forward and reverse travel operating lever 10 is operated to be moved to a F2 position on an advancing operation side from the neutral position N in FIG. 1, the point of engaging cooperation between the cooperating link pin 12 of the rotation interlocking lever 11 that interlocks with the front and back swinging operation of the forward and reverse travel operating lever 10, and the elongated hole 18 of the seesaw movement lever portion 17b is displaced to a P3 position from the P0 to swing the seesaw movement lever 17 to a d3 position from a d0 position to cause the detected surface 20 on the seesaw movement lever portion 17c to swing to a S3 position to move in a direction, in which it does not overlap the sensor detecting surface 24 of the proximity switch 23, to cancel the action of the proximity switch 23 not to output a reversing signal as shown in FIG. 3.

In the above-mentioned advancing operation, the swinging locus P0–P3 of the cooperating link pin 12 slides in the elongated hole 18 of the seesaw movement lever portion 17b in a direction, in which it separates from the seesaw axis B of the seesaw movement lever 17, whereby an amount of downward swinging movement on the seesaw movement lever portion 17b side can be suppressed to be small.

Therefore, an amount of upward swinging movement on the seesaw movement lever portion 17c side can be suppressed so as not to be increased, so that it is possible to install in the vicinity of the forward and reverse travel operating lever 10 a detected linkage mechanism composed of the proximity switch 23 of non-contact type, the seesaw movement lever 17 and the rotation interlocking lever 11 that interlocks with the swinging operation of the forward and reverse travel operating lever.

An explanation will be given below to the effects of the embodiment.

Since the vehicle reversing operation of the forward and reverse travel operating lever 10 is detected by the proximity switch 23 of non-contact type through the rotation interlocking lever 11 that interlocks with the swinging operation of the forward and reverse travel operating lever, the cooperating link pin 12 and the seesaw movement lever 17, it is unnecessary to install on the forward and reverse travel operating lever any mechanical, reversing operation detecting means for issuance of a reversing alarm, so that forces for operating the lever in the forward and reverse directions are made uniform to eliminate injury to the operating feeling. Also, it is possible to stably perform the reversing operation in a minute fashion.

Also, a sure detecting action can be obtained due to a simple arrangement, in which the detected linkage mechanism for converting movements of the forward and reverse travel operating lever 10 to transmit the same to the sensor detecting surface 24 of the proximity switch 23 is composed of the rotation interlocking lever 11 that interlocks with the swinging operation of the forward and reverse travel operating lever, and the seesaw movement lever 17, and these levers are connected to each other through the cooperating link pin 12 and the elongated hole 18.

Further, since the seesaw movement lever 17 can be suppressed to be made small in a vertical swinging range (upward and downward amounts), the detected linkage mechanism is made compact whereby the reversing operation detecting device can be received effectively in a small space above the console.

In addition, the non-contact sensor is not limited to the above-mentioned proximity switch 23 but may of course be composed of, for example, a light shielding type sensor, an electrostatic capacity sensing type sensor or the like.

What is claimed is:

1. A reversing alarm apparatus for a work vehicle provided with a forward and reverse travel operating lever device to output a forward and reverse speed command signal in accordance with an amount of an operating stroke, wherein a reversing alarm of the work vehicle is issued by a reversing operation detecting device composed of a non-contact type sensor provided on the forward and reverse travel operating lever device and, wherein the non-contact type sensor is installed with a sensor detecting surface facing in a direction parallel to a forward and reverse rotation shaft of a forward and reverse travel operating lever, and the reversing operation detecting device is composed of a detected lever linkage mechanism which swings in a plane perpendicular to the forward and reverse rotation shaft following rotation of the forward and reverse rotation shaft of the forward and reverse travel operating lever to intersect the non-contact type sensor.

2. A reversing alarm apparatus for a work vehicle provided with a forward and reverse travel operating lever device to output a forward and reverse speed command signal in accordance with an amount of an operating stroke, wherein a reversing alarm of the work vehicle is issued by a reversing operation detecting device composed of a non-contact type sensor provided on the forward and reverse travel operating lever device and, wherein the non-contact type sensor is installed with a sensor detecting surface facing in a direction parallel to a forward and reverse rotation shaft of a forward and reverse travel operating lever, and the reversing operation detecting device is composed of a detected lever linkage mechanism which swings vertically in a plane perpendicular to the forward and reverse rotation shaft following rotation of the forward and reverse rotation shaft of the forward and reverse travel operating lever to intersect the non-contact type sensor.

3. The reversing alarm apparatus according to claim 2, wherein the detected lever linkage mechanism of the reversing operation detecting device comprises a rotation interlocking lever mounted on the forward and reverse rotation shaft of the forward and reverse travel operating lever, and a seesaw movement lever, which includes on one side thereof a lever portion having an elongated hole and on the other side thereof a detected lever portion intersecting the non-contact type sensor, and the rotation interlocking lever serves as a linkage mechanism for connection of the rotation interlocking lever such that a point of engaging cooperation slides in the elongated hole of the seesaw movement lever.

4. The reversing alarm apparatus according to claim 3, wherein the detected lever linkage mechanism is such that the point of engaging cooperation between the seesaw movement lever and the forward and reverse operating rotation interlocking lever cooperates in a position close to a seesaw fulcrum when the forward and reverse operating rotation interlocking lever is located in a forward and reverse travel operating neutral turning position, and slides in a direction away from the seesaw fulcrum when the forward and reverse operating rotation interlocking lever turns in a direction of forward and reverse travel operation from the forward and reverse travel operating neutral turning position.

* * * * *